US007995315B2

(12) United States Patent  
Riley et al.

(10) Patent No.: US 7,995,315 B2  
(45) Date of Patent: Aug. 9, 2011

(54) GROUND FAULT PROTECTION CIRCUIT FOR MULTI-SOURCE ELECTRICAL DISTRIBUTION SYSTEM

(75) Inventors: Donville Andre Riley, Hartford, CT (US); Brian Matthew Aiken, Wallingford, CT (US); William James Premerlani, Scotia, NY (US)

(73) Assignee: General Electric Company, Schenectady, NY (US)

( * ) Notice: Subject to any disclaimer, the term of this patent is extended or adjusted under 35 U.S.C. 154(b) by 594 days.

(21) Appl. No.: 12/172,809

(22) Filed: Jul. 14, 2008

(65) Prior Publication Data

US 2010/0008000 A1    Jan. 14, 2010

(51) Int. Cl.
*H02H 3/00*    (2006.01)
*H02H 9/08*    (2006.01)

(52) U.S. Cl. ......................................................... 361/44
(58) Field of Classification Search ....................... 361/44
See application file for complete search history.

(56) References Cited

U.S. PATENT DOCUMENTS

| 3,558,981 | A | * | 1/1971 | Zocholl | 361/44 |
| 3,949,272 | A | * | 4/1976 | Smith | 361/48 |
| 4,110,808 | A | * | 8/1978 | Hobson et al. | 361/44 |
| 5,751,524 | A | | 5/1998 | Swindler | |
| 2002/0080535 | A1 | * | 6/2002 | Swindler et al. | 361/44 |
| 2010/0008000 | A1 | * | 1/2010 | Riley et al. | 361/44 |

OTHER PUBLICATIONS

Power Systems Engineering Data, vol. 1, No. 8; " Modified Differential Ground Fault Protection"; Authors: David L. Swindler and Carl J. Fredericks; Published by: Square D; Jul. 1994.
Power Monitoring; Summing Transformers, Model 190XSUM; KELE (www.kele.com).

* cited by examiner

*Primary Examiner* — Ronald W Leja
(74) *Attorney, Agent, or Firm* — Cantor Colburn LLP

(57) ABSTRACT

Disclosed herein is a ground fault protection circuit for an electrical distribution system, the electrical distribution system having a plurality of power sources each having an associated main circuit breaker and being electrically coupled to an associated load with a tie circuit breaker electrically coupled therebetween, the main and tie circuit breakers having associated therewith phase and neutral current transformers (CTs) for sensing an associated current. The ground fault protection circuit includes first, second and third auxiliary differential current transformers, each in signal communication with outputs of respective phase and neutral current transformers associated with respective first and second main circuit breakers and a tie circuit breaker. A control circuit has a defined topology that provides signal communication between each of the auxiliary differential current transformers.

11 Claims, 5 Drawing Sheets

GROUND FAULT PROTECTION CIRCUIT FOR MULTI-SOURCE ELECTRICAL DISTRIBUTION SYSTEM

BACKGROUND OF THE INVENTION

The present disclosure relates generally to a ground fault protection circuit for a multi-source electrical distribution system, and particularly to a ground fault protection circuit for a multi-source electrical distribution system having multiple grounding points.

Electrical power distribution systems are often configured having a plurality of polyphase power sources, each including a plurality of phase conductors and a neutral conductor. In such a system, a polyphase main bus is connected to each one of the power sources and includes a plurality of phase conductors and a neutral conductor, with main circuit breakers electrically connected in respective ones of the main buses for interrupting power flowing therethrough. A polyphase tie bus is connected between each of the main buses and includes a plurality of phase conductors and a neutral conductor, with a tie circuit breaker electrically connected in the tie bus for interrupting power flowing therethrough. Each of the main and tie buses having phase and neutral current sensors for generating signals proportional to the currents in the associated phase and neutral conductors. In such power distribution systems, it is desirable to have a ground fault protection circuit to provide automatic circuit interruption of an appropriate section of the distribution system upon detection of an undesired ground fault condition. Existing techniques to provide for ground fault protection use a second set of phase and neutral current sensors for generating another set of signals proportional to the current in the associated phase and neutral conductors, with these additional signals then being used in a modified differential ground fault protection scheme. While such existing techniques are adequate for their intended purpose, such techniques require an additional set of four phase and neutral current sensors, resulting in a total of eight current sensors per circuit breaker (an original four used for relay and meter functions associated with the respective circuit breaker, and an additional four used for modified differential ground fault protection scheme).

As such, there remains a need in the art of ground fault protection in a multi-source electrical distribution system for a ground fault protection circuit that does not require so many current sensors per circuit breaker.

BRIEF DESCRIPTION OF THE INVENTION

An embodiment of the invention includes a ground fault protection circuit for an electrical distribution system, the electrical distribution system having a plurality of power sources each having an associated main circuit breaker and being electrically coupled to an associated load with a tie circuit breaker electrically coupled therebetween, the main and tie circuit breakers having associated therewith phase and neutral current transformers (CTs) for sensing an associated current. The ground fault protection circuit includes first, second and third auxiliary differential current transformers, each in signal communication with outputs of respective phase and neutral current transformers associated with respective first and second main circuit breakers and a tie circuit breaker. A control circuit has a defined topology that provides signal communication between each of the auxiliary differential current transformers.

Another embodiment includes a ground fault protection circuit for an electrical power distribution system having: a plurality of polyphase power sources, each including a plurality of phase conductors and a neutral conductor; a polyphase main bus connected to each one of the power sources and including a plurality of phase conductors and a neutral conductor; main circuit breakers electrically connected in respective ones of the main buses for interrupting power flowing therethrough; a polyphase tie bus connected between each of the main buses and including a plurality of phase conductors and a neutral conductor; and, a tie circuit breaker electrically connected in the tie bus for interrupting power flowing therethrough, each of the main and tie buses having phase and neutral current sensors for generating signals proportional to the currents in the associated phase and neutral conductors. The ground fault protection circuit includes for each main and tie circuit breaker, an auxiliary differential current sensor in signal communication with each one of the phase and neutral current sensors associated with a respective one of the main and tie buses, each auxiliary differential current sensor having a pair of output terminals for generating a trip signal through the output terminals that varies directly with the vector sum of currents flowing through the associated phase and neutral current sensors. Also included is a ground fault trip unit associated with each one of the main and tie circuit breakers, wherein a trip signal received at a respective one of the ground fault trip units causes its associated circuit breaker to trip.

A further embodiment includes a ground fault protection circuit having: a first auxiliary differential current transformer configured to receive input signals from a first plurality of current transformers, and configured to deliver a first output signal to a control circuit, the first output signal being representative of a non-zero vector sum of currents flowing through the first plurality of current transformers; a second auxiliary differential current transformer configured to receive input signals from a second plurality of current transformers, and configured to deliver a second output signal to the control circuit, the second output signal being representative of a non-zero vector sum of currents flowing through the second plurality of current transformers; and, a third auxiliary differential current transformer configured to receive input signals from a third plurality of current transformers, and configured to deliver a third output signal to the control circuit, the third output signal being representative of a non-zero vector sum of currents flowing through the third plurality of current transformers. Each of the output signals sum to zero at junction points on the control circuit to provide a trip signal to one or more of an associated trip unit that correlates with a location of a ground fault in an electrical distribution system that causes a polarized output signal at one or more of the auxiliary differential current transformers.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention, as shown and described by the various figures and accompanying text, provides a ground fault protection system for a distribution system having a plurality of polyphase power sources and multiple grounding points.

Embodiments of the protection scheme will sense ground fault conditions in low voltage equipment and selectively trip the associated main and tie breakers. Auxiliary current transformers are employed in conjunction with existing relaying phase current transformers that enable flexible packaging, easy accessibility, and reduced cost in the number of current transformers (CTs) needed. Use of auxiliary summing current transformers in accordance with embodiments of the invention will eliminate the need for separate discrete phase sensors, requiring only one auxiliary summing sensor per circuit breaker (main or tie) to provide ground fault protection.

For example, in a four-wire wye system with an ammeter and an overcurrent current relay, a set of four discrete phase current transformers are used for the relay and/or meter devices (circuit breakers with electronic trip units for example). If such a system has multiple sources and multiple grounds, a separate set of four discrete current transformers will be required for ground fault protection, resulting in a total of eight current transformers for one circuit breaker. Alternatively, and in accordance with an embodiment of the invention, an auxiliary differential (summing) current transformer that receives inputs from all four of the discrete phase current transformers associated with one of the circuit breakers will require a total of only five current transformers per circuit breaker for ground fault protection, and will provide flexibility as to where to place the auxiliary summing current transformer. The accuracy and selectivity of the ground fault detection system using a five-CT arrangement is maintained with respect to the eight-CT arrangement.

While the embodiment described herein refers to circuit breakers having current transformer current sensors and electronic trip units as an exemplary circuit protection device, it will be appreciated that the disclosed invention is also applicable to other circuit protection devices, such as circuit breakers with remote CT's and trip elements for example.

Figure 1:
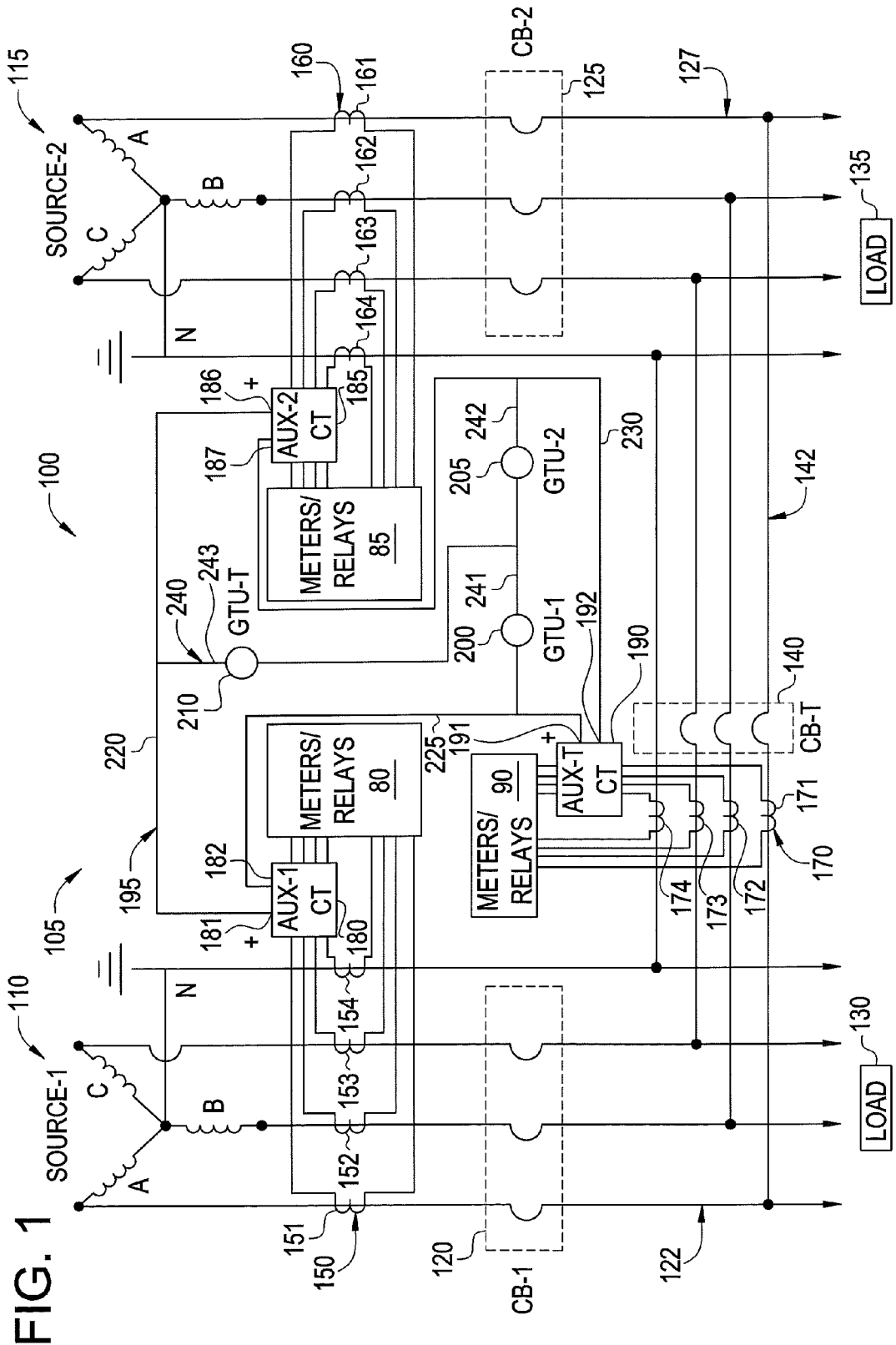
FIG. 1 depicts in schematic diagram form an electrical distribution system having a ground fault protection circuit in accordance with an embodiment of the invention.

With reference now to FIG. 1, an electrical distribution system 100 is depicted having a ground fault protection circuit 105 in accordance with an embodiment of the invention. By way of example and not limitation, the electrical distribution system 100 includes a plurality of power sources 110 (source-1), 115 (source-2) each having an associated main circuit breaker 120, 125 and being electrically coupled to an associated load 130, 135 with a tie circuit breaker 140 electrically coupled between the buses feeding the loads. The main and tie circuit breakers have associated therewith phase and neutral current transformers (CTs) 150, 160, 170 for sensing an associated current in a respective phase and neutral path. For ease of discussion, A-phase, B-phase, C-phase and neutral CTs are denoted respectively by reference numerals: 151, 152, 153, 154 (collectively referred to by reference numeral 150); 161, 162, 163, 164 (collectively referred to by reference numeral 160); and, 171, 172, 173, 174 (collectively referred to by reference numeral 170). Each of the CTs 150, 160, 170 associated with the main and tie circuit breakers 120, 125, 140 provide a secondary signal proportional to the current flow in the respective phase and neutral paths that is used by meters and/or relays 80, 85, 90 for providing overcurrent protection and/or power metering information in connection with the associated circuit breaker 120, 125, 140.

The ground fault protection circuit 105 includes a first auxiliary differential current transformer (AUX-1 CT) 180 is disposed in signal communication with each output of the phase and neutral current transformers 150 associated with a first 120 of the main circuit breakers, a second auxiliary differential current transformer (AUX-2 CT) 185 is disposed in signal communication with each output of the phase and neutral current transformers 160 associated with a second 125 of the main circuit breakers, and a third auxiliary differential current transformer (AUX-T CT) 190 is disposed in signal communication with each output of the phase and neutral current transformers 170 associated with the tie circuit breaker 140. The output leads from CTs 150 connect to individual taps of the first auxiliary differential current transformer 180, which in turn produces a secondary current output that is representative of the sum of currents in all output leads from CTs 150. The output leads from CTs 150 also pass to meters/relays 80 as discussed above. A similar arrangement is used for the second and third auxiliary differential current transformers 185, 190 in association with their respective CTs 160, 170 and meters/relays 85, 90. An example auxiliary differential current transformer suitable for the purposes disclosed herein is model number 190XSUM-4 available from Instrument Transformers Inc.

Further included in the ground fault protection circuit 105 is a control circuit 195 having a topology that provides signal communication between each of the auxiliary differential current transformers 180, 185, 190, and ground fault enabled trip units 200 (GTU-1), 205 (GTU-2), 210 (GTU-T) that are associated with a respective one of the main and tie circuit breakers 120 (CB-1 associated with GTU-1), 125 (CB-2 associated with GTU-2), 140 (CB-T associated with GTU-T), as will be described in more detail below.

Each of the first 180, second 185 and third 190 auxiliary differential current transformers are disposed and configured to sense a differential current and polarity between the CT-sensed phase and neutral currents (sensed by CTs 150, 160, 170, respectively) of the associated circuit breaker 120, 125, 140, respectively, and to output a polarized signal (discussed below with reference to FIGS. 2-5) to the control circuit 195 in response to a non-zero sum occurring at the respective auxiliary differential current transformer. In an embodiment, each of the first, second and third auxiliary differential current transformers 180, 185, 190 is a single differential current transformer.

For purposes of discussion, the polarity convention used herein for auxiliary differential current transformer 180 (associated with source-1 110 and CB-1 120) is such that a secondary current will flow out of a first terminal 181 and into a second terminal 182 in response to excess ground current flowing into power source-1 110, which will be more evident during the discussion below in connection with FIGS. 2-5. Likewise, the polarity of auxiliary differential current transformer 185 (associated with source-2 115 and CB-2 125) is such that a secondary current will flow out of a first terminal 186 and into a second terminal 187 in response to excess ground current flowing into power source-2 115. For the auxiliary differential current transformer 190 associated with CB-T 140, the polarity designation is such that a secondary current will flow out of a first terminal 191 and into a second terminal 192 in response to excess ground current flowing from power source-1 110 toward power source-2 115. Each of the first terminals 181, 186, 191 are illustrated having an associated "+" sign. While the polarity designation herein is as described above, it will be appreciated that this is for discussion purposes only, and that any polarity convention can be used as long as the convention is consistently applied.

Referring still to FIG. 1, the control circuit 195 includes a plurality of control paths, which will now be described. The first terminal 181 of the first auxiliary differential current transformer 180 is electrically connected with the first terminal 186 of the second auxiliary differential current transformer 185, thereby defining a first control path 220. The second terminal 182 of the first auxiliary differential current transformer 180 is electrically connected with the first terminal 191 of the third auxiliary differential current transformer 190, thereby defining a second control path 225. The second terminal 187 of the second auxiliary differential current transformer 185 is electrically connected with the second terminal 192 of the third auxiliary differential current transformer 190, thereby defining a third control path 230. A Y-connected control path 240 having a first leg 241, a second leg 242, and a third leg 243, is electrically connected to control paths 220, 225, 230 such that the end of the first leg 241 is electrically connected to the second control path 225, the end of the second leg 242 is electrically connected to the third control path 230, and the end of the third leg 243 is electrically connected with the first control path 220. Each of the first, second and third legs 241, 242, 243 are in signal communication with a respective one of the associated trip units 200, 205, 210. That is, trip unit GTU-1 200 is disposed in first leg 241, trip unit GTU-2 205 is disposed in second leg 242, and trip unit GTU-T 210 is disposed in third leg 243. Each of the trip units 200, 205, 210 are in signal communication with a respective circuit breaker (GTU-1 200 associated with CB-1 120, GTU-2 205 associated with CB-2 125, and GTU-T 210 associated with CB-T 140) to trip the respective circuit breaker that correlates with a location of a ground fault in the electrical distribution system 100 causing a polarized output signal at one or more of the auxiliary differential current transformers, as will be discussed in more detail below in connection with FIGS. 2-5.

Before moving to a discussion about FIGS. 2-5, it will be appreciated that the current flow of all currents in an electrical circuit follow Kirchoff's current law, which states that the sum of currents flowing towards a point, node or junction is equal to the sum of currents flowing away from that point, node or junction. As such, it will be appreciated that the sum of all currents flowing towards a junction in control circuit 195, such as the junction between first control path 220 and third leg 243, for example, must equal zero. It will also be appreciated that the current flow out of each first terminal 181, 186, 191 of the respective auxiliary differential current transformer will be equal to the current flow into each respective second terminal 182, 187, 192.

In view of the foregoing, and with reference now to FIGS. 2-5, it will be appreciated that each of the polarized output signals summing to zero at a junction point on the control circuit 195 will provide a trip signal to one or more of an associated trip unit 200, 205, 210 that correlates with the existence of and location of a ground fault in the electrical distribution system 100 causing a polarized output signal at one or more of the auxiliary differential current transformers 180, 185, 190.

Figure 2:
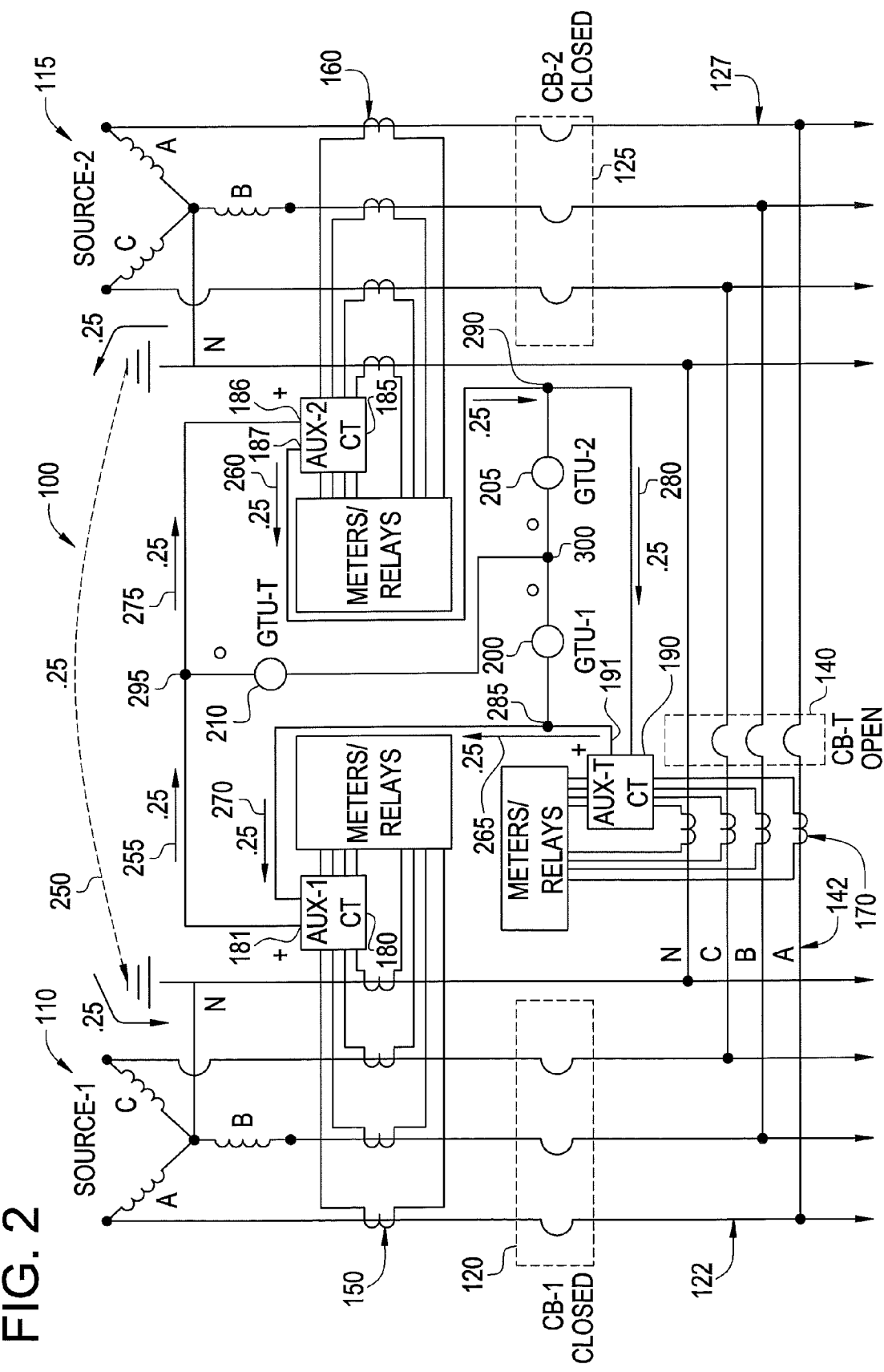
FIGS. 2-5 depict the schematic diagram of FIG. 1 with various normal an abnormal ground currents, all in accordance with an embodiment of the invention.

Reference is now made to FIG. 2, which depicts the electrical distribution system 100 of FIG. 1 in a normal operating condition with CB-1 120 closed, CB-2 125 closed, and CB-T 140 open, and with no ground fault condition present. A normal ground current flow 250 of 0.25 units is illustrated passing from source-2 115 to source-1 110. As described herein, ground current flow is expressed in terms of units as opposed to amperes, since the analysis presented herein is unit-independent. With an excess of ground current 250 flowing into source-1 110, the output of CTs 150 will register an imbalance of current in conductors 122, which will be seen by first auxiliary differential current transformer 180 as a non-zero sum of current in the outputs of CTs 150 that produces a secondary output signal 255 out of the "+" first terminal 181 (polarity convention discussed above) of first auxiliary differential current transformer 180 representative of the 0.25 unit current imbalance. With the ground current 250 leakage being out of source-2 115, the output of CTs 160 will register an imbalance of current in conductors 127, which will be seen by second auxiliary differential current transformer 185 as a non-zero sum of current in the outputs of CTs 160 that produces a secondary output signal 260 out of the second terminal 187 (consistent use of the above established polarity convention) of second auxiliary differential current transformer 185 representative of the 0.25 unit current imbalance. Since there is no ground fault condition, the ground current naturally returns back to source-2 115 by way of the neutral conductor N associated with tie conductors 142 (CB-T 140 being open), flowing through conductor N from source-1 110 toward source-2 115. As such, the output of CTs 170 will register an imbalance of current in conductors 142 (CB-T 140 being open and ground current flowing through neutral N), which will be seen by third auxiliary differential current transformer 190 as a non-zero sum of currents in the outputs of CTs 170 that produces a secondary output signal 265 out of the first terminal 191 (consistent use of the above established polarity convention) of third auxiliary differential current transformer 190 representative of the 0.25 unit current imbalance flowing from source-1 110 back to source-2 115.

Since all currents leaving each respective auxiliary differential current transformer 180, 185, 190 must equal the current entering, current signals 270, 275, 280 at 0.25 units each can be established. Applying Kirchoff's current law at nodes 285, 290, 295, 300 establishes that a zero current signal is passing through trip units GTU-1 200, GTU-2 205 and GTU-T 210, which is to be expected since no ground fault condition exists.

Figure 3:
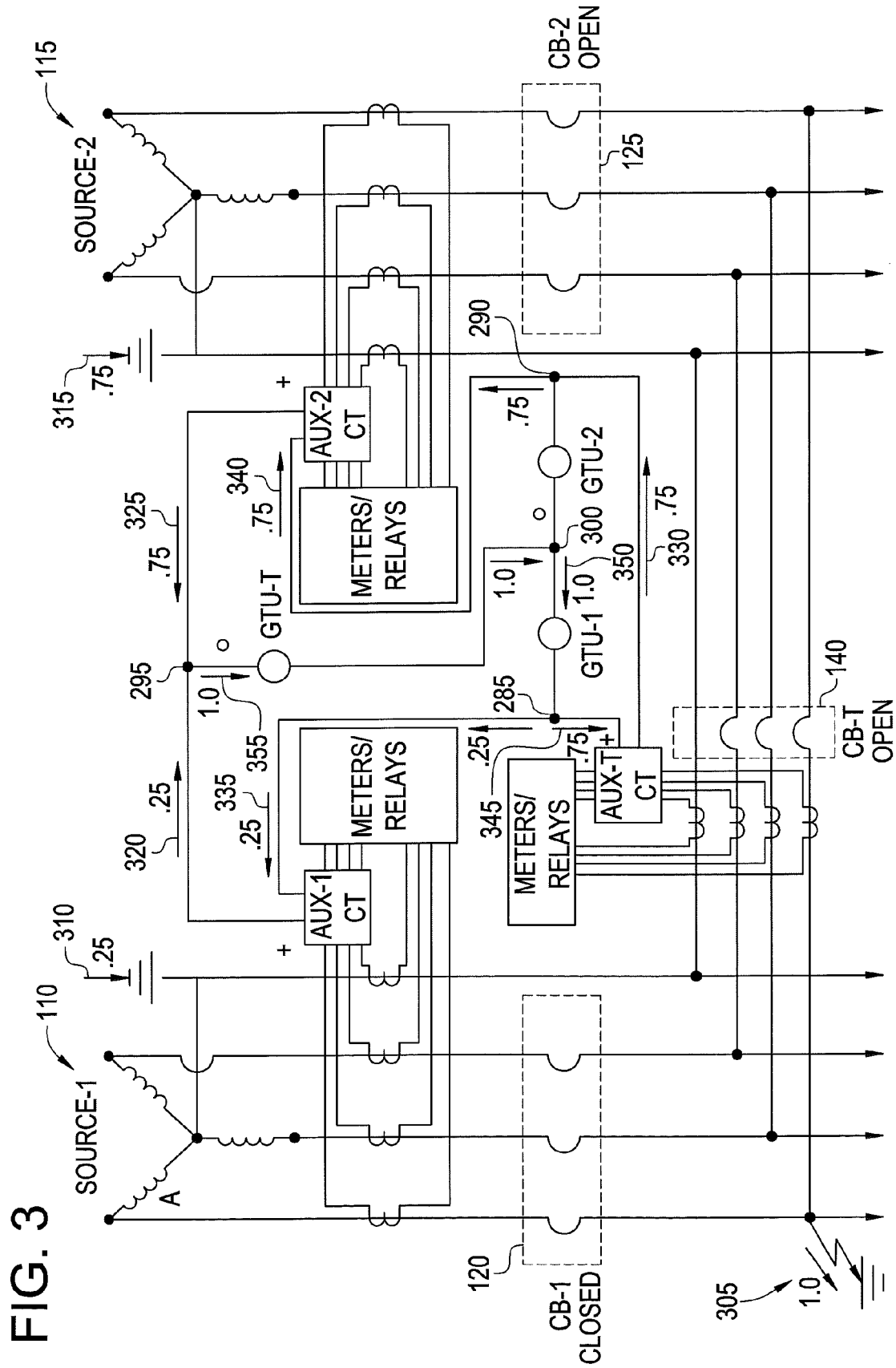

Referring now to FIG. 3, which depicts CB-1 120 closed, CB-2 125 open, CB-T 140 open, and a ground fault condition 305 of 1.0 units on the A-phase associated with source-1 110. For discussion purposes, the return ground path is depicted as 0.25 units 310 returning to source-1 110, and 0.75 units 315 returning to source-2 115. However, it will be appreciated that any number and distribution of return ground paths could exist without departing from the outcome of the analysis presented herein. To maintain clarity of FIG. 3, not all reference numerals associated with like elements of FIGS. 1 and 2 are illustrated, but such elements are clearly illustrated in FIGS. 1 and 2, which should be referred to in combination with the discussion herein of FIG. 3. In a similar manner as discussed above, an excess of 0.25 units of ground current flowing into source-1 110 will produce an output signal 320 of 0.25 units out of first terminal 181 of AUX-1 CT 180, an excess of 0.75 units of ground current flowing into source-2 115 will produce an output signal 325 of 0.75 units out of first terminal 186 of AUX-2 CT 185, and a ground current of 0.75 units flowing from source-2 115 toward the ground fault condition 305 (traveling left toward source-1 110 across the tie conductors 142) will produce an output signal 330 of 0.75 units out of second terminal 192 AUX-T CT 190. Equal current signals leaving and entering each respective auxiliary differential current transformer 180, 185, 190 establishes current signals 335, 340, 345. Applying Kirchoff's current law at nodes 285, 290, 295, 300 establishes current signals 350 and 355 of 1.0 units flowing through GTU-1 200 and GTU-T 210, respectively, and a zero current signal flowing through GTU-2 205. As such, trip units GTU-1 200 and GTU-T 210 will generate a trip signal to associated circuit breakers CB-1 120 and CB-T 140, respectively, to isolate and clear the ground fault condition 305. It should be noted that even with CB-T 140 already being open, the ground fault protection circuit 105 still produces a trip signal for CB-T 140 (via GTU-T 210 receiving a trip signal of 1.0 units), as would be expected in order to keep CB-T 140 in the open position until the ground fault condition 305 can be cleared and corrected.

Figure 4:
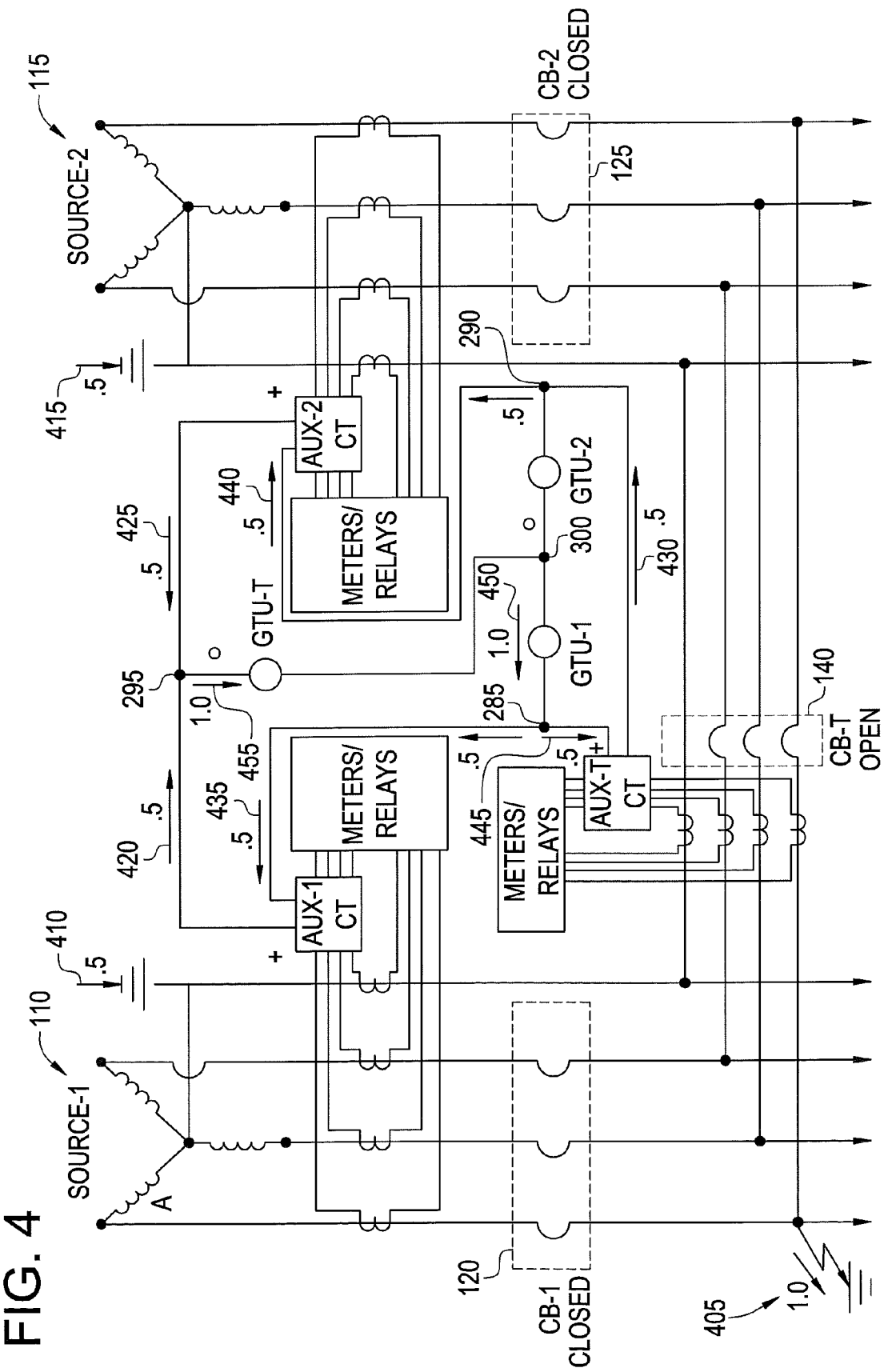

Referring now to FIG. 4, which depicts CB-1 120 closed, CB-2 125 closed, CB-T 140 open, and a ground fault condition 405 of 1.0 units on the A-phase associated with source-1 110. For discussion purposes, the return ground path is depicted as 0.5 units 410 returning to source-1 110, and 0.5 units 415 returning to source-2 115. However, it will be appreciated that any number and distribution of return ground paths could exist without departing from the outcome of the analysis presented herein. To maintain clarity of FIG. 4, not all reference numerals associated with like elements of FIGS. 1 and 2 are illustrated, but such elements are clearly illustrated in FIGS. 1 and 2, which should be referred to in combination with the discussion herein of FIG. 4. In a similar manner as discussed above, an excess of 0.5 units of ground current flowing into source-1 110 will produce an output signal 420 of 0.5 units out of first terminal 181 of AUX-1 CT 180, an excess of 0.5 units of ground current flowing into source-2 115 will produce an output signal 425 of 0.5 units out of first terminal 186 of AUX-2 CT 185, and a ground current of 0.5 units flowing from source-2 115 toward the ground fault condition 405 (traveling left toward source-1 110 across the tie conductors 142) will produce an output signal 430 of 0.5 units out of second terminal 192 AUX-T CT 190. Equal current signals leaving and entering each respective auxiliary differential current transformer 180, 185, 190 establishes current signals 435, 440, 445. Applying Kirchoff's current law at nodes 285, 290, 295, 300 establishes current signals 450 and 455 of 1.0 units flowing through GTU-1 200 and GTU-T 210, respectively, and a zero current signal flowing through GTU-2 205. As such, trip units GTU-1 200 and GTU-T 210 will generate a trip signal to associated circuit breakers CB-1 120 and CB-T 140, respectively, to isolate and clear the ground fault condition 405. It should be noted that even with CB-T 140 already being open, the ground fault protection circuit 105 still produces a trip signal for CB-T 140 (via GTU-T 210 receiving a trip signal of 1.0 units), as would be expected in order to keep CB-T 140 in the open position until the ground fault condition 405 can be cleared and corrected.

Figure 5:
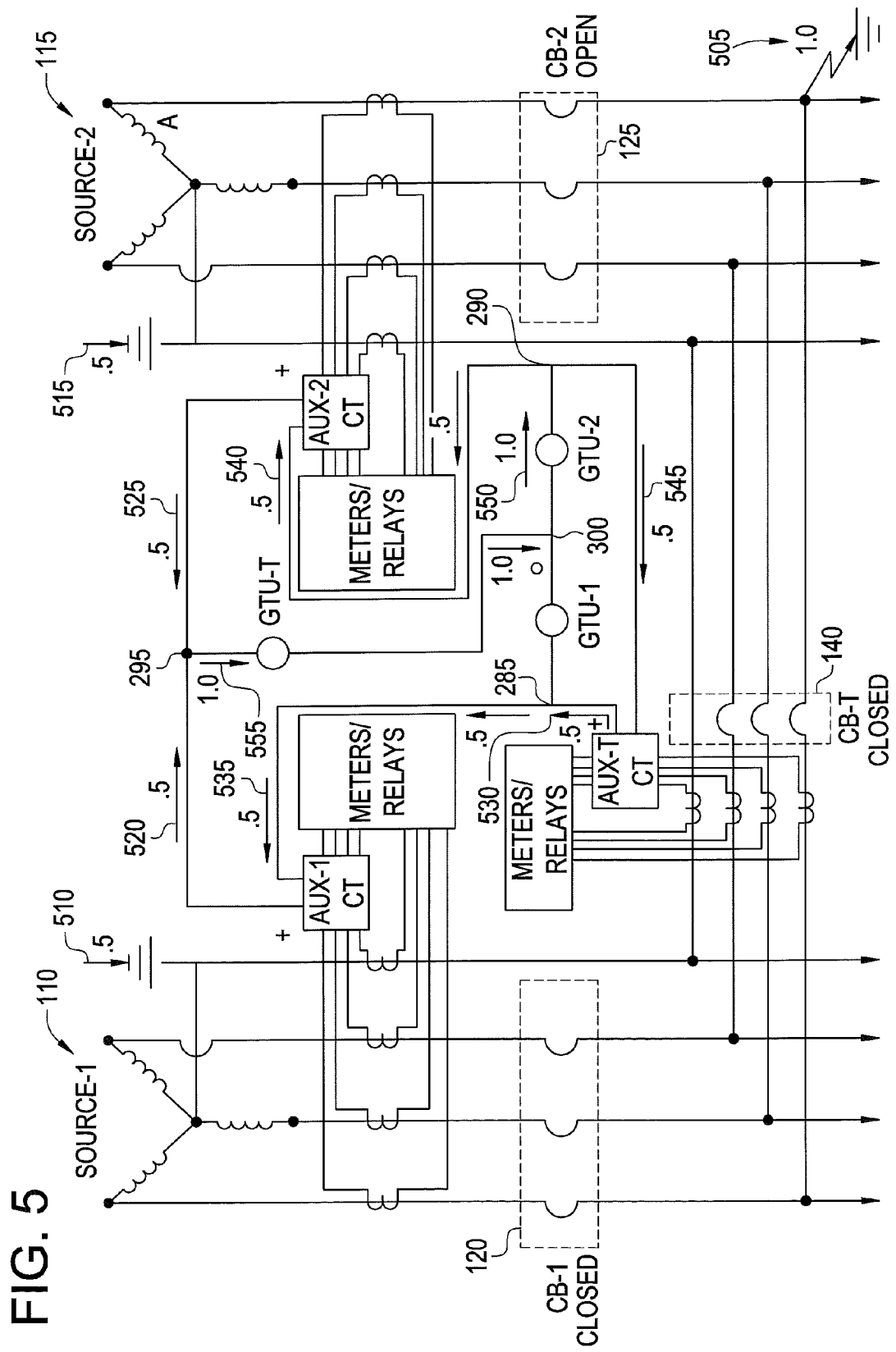

Referring now to FIG. 5, which depicts CB-1 120 closed, CB-2 125 open, CB-T 140 closed, and a ground fault condition 505 of 1.0 units on the A-phase associated with source-2 115. For discussion purposes, the return ground path is depicted as 0.5 units 510 returning to source-1 110, and 0.5 units 515 returning to source-2 115. However, it will be appreciated that any number and distribution of return ground paths could exist without departing from the outcome of the analysis presented herein. To maintain clarity of FIG. 5, not all reference numerals associated with like elements of FIGS. 1 and 2 are illustrated, but such elements are clearly illustrated in FIGS. 1 and 2, which should be referred to in combination with the discussion herein of FIG. 5. In a similar manner as discussed above, an excess of 0.5 units of ground current flowing into source-1 110 will produce an output signal 520 of 0.5 units out of first terminal 181 of AUX-1 CT 180, an excess of 0.5 units of ground current flowing into source-2 115 will produce an output signal 525 of 0.5 units out of first terminal 186 of AUX-2 CT 185, and a ground current of 0.5 units flowing from source-1 110 toward the ground fault condition 505 (traveling right toward source-2 115 across the tie conductors 142) will produce an output signal 530 of 0.5 units out of first terminal 191 AUX-T CT 190. Equal current signals leaving and entering each respective auxiliary differential current transformer 180, 185, 190 establishes current signals 535, 540, 545. Applying Kirchoff's current law at nodes 285, 290, 295, 300 establishes current signals 550 and 555 of 1.0 units flowing through GTU-2 205 and GTU-T 210, respectively, and a zero current signal flowing through GTU-1 200. As such, trip units GTU-2 205 and GTU-T 210 will generate a trip signal to associated circuit breakers CB-2 125 and CB-T 140, respectively, to isolate and clear the ground fault condition 505. It should be noted that even with CB-2 125 already being open, the ground fault protection circuit 105 still produces a trip signal for CB-2 125 (via GTU-2 205 receiving a trip signal of 1.0 units), as would be expected in order to keep CB-2 125 in the open position until the ground fault condition 505 can be cleared and corrected.

FIGS. 2-5 illustrate various scenarios involving normal and abnormal ground current flow. Such illustrations are not exhaustive and many other scenarios of different ground current flow paths could be equally illustrated with similar analysis applied to describe the functioning of ground fault protection circuit 105. All such scenarios are contemplated herein and are considered fully within the scope of the invention disclosed herein.

In an embodiment, the first, second and third auxiliary differential current transformers 180, 185, 190 are separate and distinct from the meters/relays 80, 85, 90 and from the trip units GTU-1 200, GTU-2 205, GTU-T 210, thereby enabling them to be disposed at a location remote from the associated circuit breakers 120, 125, 140, such as in a control cabinet for example.

In view of the foregoing discussion, it can be seen that each of the main and tie circuit breakers 120, 125, 140 have associated therewith A-phase, B-phase, C-phase and Neutral current transformers 150, 160, 170, and have associated therewith one of the first, second and third auxiliary differential current transformers 180, 185, 190, thereby establishing a ground fault protection circuit 105 having a total of five current transformers per main and tie circuit breaker.

While embodiments of the invention have been described employing current transformers 180, 185, 190 as example current sensors, it will be appreciated that the scope of the invention is not so limited, and that other current sensors, such as Hall effect current sensors for example, having input/output characteristics suitable for the purpose disclosed herein also fall within the ambit of the disclosed invention. All such current sensors are contemplated herein and are considered fully within the scope of the invention disclosed herein.

As disclosed, some embodiments of the invention may include some of the following advantages: a ground fault protection circuit in combination with an overcurrent and metering arrangement that requires only five current transformers per main and tie circuit breaker.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A ground fault protection circuit for an electrical distribution system, the electrical distribution system having a plurality of power sources each having an associated main circuit breaker and being electrically coupled to an associated load with a tie circuit breaker electrically coupled therebetween, the main and tie circuit breakers having associated therewith phase and neutral current transformers (CTs) for sensing an associated current, the ground fault protection circuit comprising:
   a first auxiliary differential current transformer in signal communication with each output of the phase and neutral current transformers associated with a first of the main circuit breakers;
   a second auxiliary differential current transformer in signal communication with each output of the phase and neutral current transformers associated with a second of the main circuit breakers;
   a third auxiliary differential current transformer in signal communication with each output of the phase and neutral current transformers associated with the tie circuit breaker; and
   a control circuit having a topology that provides signal communication between each of the auxiliary differential current transformers.

2. The ground fault protection circuit of claim 1, wherein control circuit topology further provides for the first, second and third auxiliary differential current transformers to be in signal communication with an associated ground fault enabled trip unit associated with a respective one of the main and tie circuit breakers.

3. The ground fault protection circuit of claim 2, wherein each of the first, second and third auxiliary differential current transformers are disposed and configured to sense a differential current and polarity between the CT-sensed phase and neutral currents of the associated circuit breaker, and to output a polarized signal to the control circuit in response to a non-zero sum.

4. The ground fault protection circuit of claim 3, wherein each of the polarized output signals sum to zero at a junction point on the control circuit to provide a trip signal to one or more of an associated trip unit that correlates with a location of a ground fault in the electrical distribution system causing a polarized output signal at one or more of the auxiliary differential current transformers.

5. The ground fault protection circuit of claim 1, wherein the first, second and third auxiliary differential current transformers are disposed at a location remote from the associated circuit breaker.

6. The ground fault protection circuit of claim 1, wherein each of the first, second and third auxiliary differential current transformers is a single differential current transformer.

7. The ground fault protection circuit of claim 1, wherein each of the main and tie circuit breakers have associated therewith an A-phase current transformer, a B-phase current transformer, a C-phase current transformer, a Neutral current transformer, and one of the first, second and third auxiliary differential current transformers, thereby establishing a ground fault protection circuit having a total of five current transformers per main and tie circuit breaker.

8. A ground fault protection circuit for an electrical power distribution system having: a plurality of polyphase power sources, each including a plurality of phase conductors and a neutral conductor; a polyphase main bus connected to each one of the power sources and including a plurality of phase conductors and a neutral conductor; main circuit breakers electrically connected in respective ones of the main buses for interrupting power flowing therethrough; a polyphase tie bus connected between each of the main buses and including a plurality of phase conductors and a neutral conductor; and, a tie circuit breaker electrically connected in the tie bus for interrupting power flowing therethrough, each of the main and tie buses having phase and neutral current sensors for generating signals proportional to the currents in the associated phase and neutral conductors, the ground fault protection circuit comprising:
   for each main and tie circuit breaker, an auxiliary differential current sensor in signal communication with each one of the phase and neutral current sensors associated with a respective one of the main and tie buses, each auxiliary differential current sensor having a pair of output terminals for generating a trip signal through the output terminals that varies directly with the vector sum of currents flowing through the associated phase and neutral current sensors;
   a ground fault trip unit associated with each one of the main and tie circuit breakers, wherein a trip signal received at a respective one of the ground fault trip units causes its associated circuit breaker to trip.

9. A ground fault protection circuit, comprising:
   a first auxiliary differential current transformer configured to receive input signals from a first plurality of current transformers, and configured to deliver a first output signal to a control circuit, the first output signal being representative of a non-zero vector sum of currents flowing through the first plurality of current transformers;
   a second auxiliary differential current transformer configured to receive input signals from a second plurality of current transformers, and configured to deliver a second output signal to the control circuit, the second output signal being representative of a non-zero vector sum of currents flowing through the second plurality of current transformers;
   a third auxiliary differential current transformer configured to receive input signals from a third plurality of current transformers, and configured to deliver a third output signal to the control circuit, the third output signal being representative of a non-zero vector sum of currents flowing through the third plurality of current transformers;
   wherein each of the output signals sum to zero at junction points on the control circuit to provide a trip signal to one or more of an associated trip unit that correlates with a location of a ground fault in an electrical distribution system that causes a polarized output signal at one or more of the auxiliary differential current transformers.

10. The ground fault protection circuit of claim 9, wherein:
   the first, second and third auxiliary differential current transformers are electrically connected to the control circuit with a defined polarity, with first and second output terminals of each auxiliary differential current transformer having first and second polarities, respectively.

11. The ground fault protection circuit of claim 10, wherein:
   the first terminal of the first auxiliary differential current transformer is electrically connected with the first terminal of the second auxiliary differential current transformer, thereby defining a first control path;
the second terminal of the first auxiliary differential current transformer is electrically connected with the first terminal of the third auxiliary differential current transformer, thereby defining a second control path;
the second terminal of the second auxiliary differential current transformer is electrically connected with the second terminal of the third auxiliary differential current transformer, thereby defining a third control path; and
further comprising a Y-connected control path having a first leg, a second leg, and a third leg, wherein the end of the first leg is electrically connected to the second path, the end of the second leg is electrically connected to the third control path, and the end of the third leg is electrically connected with the first path;
wherein the first, second and third legs are each in signal communication with a respective one of the associated trip units;
wherein each of the trip units are in signal communication with a respective circuit breaker to trip the respective circuit breaker at a location in an electrical distribution system that correlates with a location of a ground fault in the electrical distribution system causing a polarized output signal at one or more of the auxiliary differential current transformers.

* * * * *